UNITED STATES PATENT OFFICE.

JULIUS WEISE, FRIEDRICH RIECHE, AND ADOLF BARTH, OF OESTRICH-ON-THE-RHINE, GERMANY, ASSIGNORS TO THE FIRM OF RUDOLPH KOEPP & CO., OF OESTRICH-ON-THE-RHINE, GERMANY.

PROCESS OF MAKING FORMATES.

No. 820,373.      Specification of Letters Patent.      Patented May 8, 1906.

Original application filed April 1, 1904, Serial No. 202,661. Divided and this application filed March 15, 1905. Serial No. 250,697.

*To all whom it may concern:*

Be it known that we, JULIUS WEISE, FRIEDRICH RIECHE, and ADOLF BARTH, subjects of the German Emperor, and residents of Oestrich-on-the-Rhine, Germany, have invented certain new and useful Improvements in the Manufacture of Formates, of which the following is a specification.

In our application for a United States Patent of April 1, 1904, Serial No. 202,661, we have described a process of manufacturing formates from carbon monoxid and caustic alkali. In this application we have also shown why the attempts hitherto made to synthesize formates from carbon monoxid and caustic alkalies had failed, as the experimenters made their steps in wrong directions and endeavored to either use the agents in a highly-concentrated state or to exclude the water, while it is the water which is essential for the reaction and expedites the process. Without the help of water it was difficult to combine carbon monoxid with caustic alkalies and much less with oxids of alkaline earths. At the most the latter served for giving a larger surface of contact to the solid caustic soda without partaking in the reaction. With our process as described in the said application, on the contrary, the behavior of the caustic alkalies is quite different, as the carbon monoxid rapidly and easily combines with the caustic alkali.

Our invention relates to a similar process of manufacturing formates in which the alkalies are replaced by alkaline earths, provided that a sufficient quantity of water be employed. This process will prove important and profitable in many cases by reason of the greater cheapness of the agents.

As stated in the said application, our process consists in making an aqueous solution of a caustic alkali, or in the present case a solution or suspension of an alkaline earth, heating the solution or suspension to a high temperature in a closed vessel, preferably beyond the boiling-point of the solution or suspension, and in admitting carbon monoxid and causing the two agents to act upon each other while under agitation or in a finely-divided condition.

The rapidity of the reaction increases proportionally to the temperature, while the concentration exercises no great influence if sufficient water be present. The operation must be carried out in closed vessels to prevent the water from evaporating. The closed vessels may be of any known and approved construction. The heating of these closed vessels may be effected in any known manner. In order that the operation may take place rapidly, it is further necessary that the liquid and gas should be in intimate contact, for which purpose any suitable known device can be used. For instance, the liquid may be atomized by stirring devices or nozzles or it may be distributed in thin layers, and the gas may be blown into the vessel in a finely-divided state.

The new improved method may be carried out in various manners. For attaining the result it is important and necessary that the water be present in a sufficient quantity, that the temperature be maintained above 100° centigrade, and that the agents (a gas and a liquid) be most finely divided and intimately mixed.

Instead of water also solutions of salts of alkalies may be used—for example, sodium sulfate or sodium carbonate. In such cases of course formates of alkalies instead of formates of alkaline earths are produced during the reaction.

If instead of pure carbon monoxid a mixture of the latter with other gases may be used these latter gases are blown off during the operation through a suitable valve.

The operation proceeds more slowly with the alkaline earths unless the temperature be correspondingly raised, to which there is no objection, for no decomposition takes place even at 250° centigrade when water is used as herein described.

Following are a few examples of carrying out the method.

Example I: Milk of lime of 10° Baumé is atomized at 220° centigrade in a closed vessel provided with a stirring device and heated carbon monoxid is pumped into the vessel. In an hour the reaction will have terminated quantitatively.

Example II: A solution of sodium sulfate of 20° Baumé and the equivalent quantity of caustic lime are introduced into a cylinder provided with many sieve bottoms and brought into most intimate contact with carbon monoxid at 200° centigrade. After an hour a solution of sodium formate will be formed, which is divided from the precipitated sulfate of lime by filtration.

Example III: When in Example II a solution of soda is employed instead of the solution of sodium sulfate, sodium formate and carbonate of lime will result.

What we claim as our invention, and desire to secure by Letters Patent, is—

1. The herein-described process of manufacturing formates, which consists in making an aqueous solution of an alkaline earth, heating the aqueous solution to a high temperature in a closed vessel, admitting thereto carbon monoxid, and by agitation causing the two agents to act upon each other.

2. The herein-described process of manufacturing formates, which consists in making an aqueous solution of an alkaline earth, heating the aqueous solution to a temperature above the boiling-point in a closed vessel, admitting thereto carbon monoxid, and by agitation causing the two agents to act upon each other.

3. The herein-described process of manufacturing formates, which consists in making an aqueous solution of a salt of an alkali and an alkaline earth, heating the aqueous solution to a temperature above the boiling-point in a closed vessel, admitting thereto carbon monoxid, and by agitation causing the two agents to act upon each other.

In testimony whereof we have signed our names to this specification in the presence of two subscribing witnesses.

JULIUS WEISE.
FRIEDRICH RIECHE.
ADOLF BARTH.

Witnesses:
  FRANZ HASSLACHER,
  ERWIN DIPPEL.